Patented Oct. 24, 1950

2,527,264

UNITED STATES PATENT OFFICE 2,527,264

METHANE DYES AND THEIR PREPARATION

John David Kendall and Harry Derek Edwards, Ilford, England, assignors to Ilford Limited, Ilford, England, a British company No Drawing. Application August 5, 1947, Serial No. 766,454. In Great Britain August 13, 1946

12 Claims. (Cl. 260—307)

This invention relates to the production of methane dyes and particularly to the production of dyes which are tri-heterocyclo substituted methanes.

Scheibe and Rossner have described in Berichte der Deutschen Chemischen Gesellschaft, volume 53 at page 2064 (1920), a method of producing tri-quinolyl(2)-methane by heating together quinaldine and 2-chlorquinoline. In this reaction it appears that one molecule of quinaldine reacts with two molecules of 2-chlorquinoline with the elimination of two molecules of hydrochloric acid.

We have attempted to extend this reaction, using Scheibe and Rossner's reaction conditions. However, using one molecular equivalent of 1-methyl benzthiazole and two molecular equivalents of 2-chlorbenzthiazole, no tri-benzthiazolyl-methane could be isolated. Similarly, using one molecular equivalent of 1-methyl benzthiazole and two molecular equivalents of 2-chlorquinoline, no benzthiazolyl-diquinolyl(2)-methane could be isolated. It is thus clear that the Scheibe and Rossner conditions are not practical for the production of other tri-heterocyclo methane compounds.

It will be observed that the Scheibe and Rossner process relies on the use of a free heterocyclic nitrogen base containing a reactive methyl group in $\alpha$ or $\gamma$ position to the heterocyclic nitrogen atom. It has now been discovered that if instead of using the free heterocyclic nitrogen base containing the reactive methyl group in $\alpha$ or $\gamma$ position to the heterocyclic nitrogen atom there is employed an alkali-metal derivative of such base, the reaction preferably being carried out in a cooled solvent such as liquid ammonia, the reaction takes place vigorously to form the tri-heterocyclo-methanes in satisfactory yield.

According to the present invention, therefore, a process for the production of methane dyes comprises reacting together an alkali-metal salt of a heterocyclic nitrogen base containing a reactive methyl group in $\alpha$ or $\gamma$ position to the heterocyclic nitrogen atom with a heterocyclic nitrogen base containing a halogen atom in $\alpha$ or $\gamma$ position to the heterocyclic nitrogen atom. Preferably the reaction is effected in a solvent in which the reactants can ionize but which does not decompose the alkali-metal salt and more particularly, according to the invention, the solvent is liquid ammonia.

It is believed that the reaction proceeds in two stages thus:

Stage 1

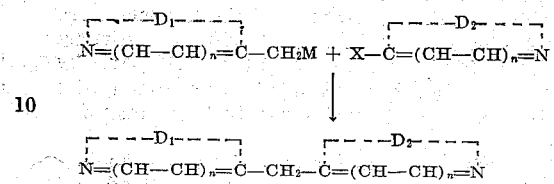

One of the hydrogen atoms on the central carbon atom is then replaced by alkali-metal and the reaction proceeds thus:

Stage 2

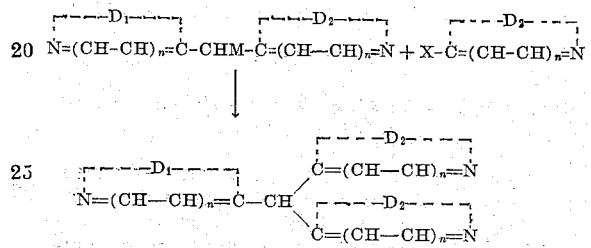

In the foregoing formulae $D_1$ and $D_2$ are the residues of heterocyclic nitrogen compounds, M is an atom of an alkali-metal, X is a halogen and $n$ is nought or one.

The heterocyclic nitrogen bases employed in this invention, i. e. the rings of which $D_1$ and $D_2$ form part, may be, for example, thiazoles, oxazoles, selenazoles and their polycyclic homologues such as those of the benzene, naphthalene, acenaphthene and anthracene series, pyridine and its polycyclic homologues such as quinoline and $\alpha$- and $\beta$-naphthaquinolines, lepidines, indolenines, diazoles such as pyrazoles, imidazoles and thio-$\beta\beta'$-diazole, diazines such as pyrimidines and quinazolines, thiazolines, oxazolines and selenazolines. The polycyclic compounds of these series may also be substituted in the carbocyclic rings with alkyl, aralkyl or aryl groups, alkoxy or amino groups, or halogen atoms.

The halogen atom X may be chlorine, bromine or iodine, but chlorine is generally preferable as the chlorintermediates are the simplest to make.

Although, as indicated by the above formulae, the reaction requires two molecular equivalents of the halogen compound to one of the reactive methyl compound, it is not, in fact, necessary to use such proportions. Thus equimolecular proportions will yield the same product though in smaller yield, part of the reactive methyl compound taking no part in the reaction. Further, as will be seen from the above formulae, two atoms of alkali-metal are necessary, and this is best achieved by carrying out the reaction in the presence of excess of alkali-metal.

It is not necessary to isolate the alkali-metal salt, and indeed it is generally inconvenient to do so. The preferred procedure is to add the alkali-metal to liquid ammonia, forming the alkali-metal amide (e. g. sodamide or potassamide) and then to add to this reaction mixture first the heterocyclic compound containing the reactive methyl group and then the heterocyclic compound containing the halogen atom.

The following examples illustrate the invention:

EXAMPLE 1

*Preparation of tri-benzthiazolyl(1)-methane*

0.92 part by weight of sodium were dissolved in 50 parts by weight of liquid ammonia, and a small quantity of ferric nitrate added as catalyst. The flask was maintained cold by immersion in a bath containing alcohol and solid carbon dioxide. 2.98 parts by weight of 1-methyl benzthiazole were then added with mechanical stirring, the stirring continued for ten minutes and then 6.75 parts by weight of 1-chlor benzthiazole was added, the stirring being continued for a further ten minutes.

The flask was then removed from the cooling bath, 50 parts by weight of ether was added and the ammonia allowed to evaporate at room temperature. The ether was then removed and the residue washed with water and ethyl alcohol and then recrystallised from benzene. The product consisted of pale yellow needles melting at 271° C.

EXAMPLE 2

*Preparation of benzthiazolyl(1)-di[benzoxazolyl(1)]-methane*

The procedure of Example 1 was followed except that the 1-methyl benzthiazole was replaced by 6.11 parts by weight of 1-chlor benzoxazole. The product after recrystallisation from benzene consisted of a pale yellow solid melting above 280° C.

EXAMPLE 3

*Preparation of quinolyl(2)-di[benzthiazolyl(1)]-methane*

The procedure of Example 1 was followed except that 1-methyl benzthiazole was replaced by 2.86 parts by weight of quinaldine. The product after recrystallisation from ethyl alcohol consisted of red crystals melting at 190° C.

EXAMPLE 4

*Preparation of quinolyl(4)-di[benzthiazolyl(1)]-methane*

The procedure of Example 1 was followed except that the 1-methyl benzthiazole was replaced by 2.86 parts by weight of lepidine. The product, after boiling out with petroleum ether, consisted of orange crystals melting at 239° C.

EXAMPLE 5

*Preparation of thiazolinyl(2)-di[benzthiazolyl(1)]-methane*

The procedure of Example 1 was followed except that the 1-methyl benzthiazole was replaced by 2.02 gm. of μ-methyl thiazoline. The product consisted of pale yellow crystals sparingly soluble in both ethyl and methyl alcohol.

EXAMPLE 6

*Preparation of benzthiazolyl(1)-di[quinolyl(4)]-methane*

The procedure of Example 1 was followed except that the 1-chlor benzthiazole was replaced by 6.25 gm. of 4-chlorquinoline and that the ammonia was allowed to evaporate overnight, the product being isolated by benzene extraction from the residue. After crystallisation from ethyl alcohol the compound was obtained as colourless crystals, M. P. 264° C.

Analysis: $C_{26}H_{17}N_3S$ requires $S=7.92\%$; found, $S=8.02\%$.

Many of the tri-heterocyclo-methane dyes of this invention are valuable sensitisers for silver halide photographic emulsions, e. g. silver iodide, silver bromide, silver chloride, silver iodobromide and silver chlorobromide gelatin emulsions, the increased sensitivity usually being imparted in the blue and/or green regions of the spectrum. Thus, for example, the product of Example 2, included in a gelatino silver iodobromide emulsion, imparts a band of sensitivity extending to 5800 Å. with a maximum at 5400 Å., and the product of Example 5, included in a gelatino silver chloride emulsion, imparts a band of sensitivity with a maximum at 4300 Å.

What we claim is:

1. A process for the production of methane dyes which comprises reacting together an alkali-metal salt of a heterocyclic nitrogen base containing a reactive methyl group in one of the positions α and γ to the heterocyclic nitrogen atom with a heterocyclic nitrogen base containing a halogen atom in one of the positions α and γ to the heterocyclic nitrogen atom, the reaction being effected in liquid ammonia.

2. A process for the production of methane dyes which comprises reacting together a sodium salt of a heterocyclic nitrogen base containing a reactive methyl group in one of the positions α and γ to the heterocyclic nitrogen atom with a heterocyclic nitrogen base containing a halogen atom in one of the positions α and γ to the heterocyclic nitrogen atom, the reaction being effected in liquid ammonia.

3. A process for the production of methane dyes which comprises reacting together an alkali-metal salt of a heterocyclic nitrogen base containing a reactive methyl group in one of the positions α and γ to the heterocyclic nitrogen atom with 1-chlorbenzthiazole, the reaction being effected in liquid ammonia.

4. A process for the production of methane dyes which comprises reacting together an alkali-metal salt of a heterocyclic nitrogen base containing a reactive methyl group in one of the positions α and γ to the heterocyclic nitrogen atom with 1-chlorbenzoxazole, the reaction being effected in liquid ammonia.

5. A process for the production of methane dyes which comprises dissolving an alkali-metal in liquid ammonia, adding thereto a heterocyclic nitrogen base containing a reactive methyl group in one of the positions α and γ to the heterocyclic nitrogen atom and then adding a heterocyclic nitrogen base containing a halogen atom in one of the positions α and γ to the heterocyclic nitrogen atom.

6. A process for the production of methane dyes which comprises dissolving an alkali-metal in liquid ammonia, adding thereto a heterocyclic nitrogen base containing a reactive methyl group in one of the positions α and γ to the heterocyclic nitrogen atom and then adding a 1-chlorbenzthiazole.

7. A process for the production of methane dyes which comprises dissolving an alkali-metal in liquid ammonia, adding thereto a heterocyclic nitrogen base containing a reactive methyl group in one of the positions α and γ to the heterocyclic nitrogen atom and then adding a 1-chlorbenzoxazole.

8. A process for the production of methane dyes which comprises dissolving sodium in liquid ammonia, adding thereto a heterocyclic nitrogen base containing a reactive methyl group in one of the positions α and γ to the heterocyclic nitrogen atom and then adding a 1-chlorbenzthiazole.

9. A process for the production of methane dyes which comprises dissolving sodium in liquid ammonia, adding thereto a heterocyclic nitrogen base containing a reactive methyl group in one of the positions α and γ to the heterocyclic nitrogen atom and then adding a 1-chlorbenzoxazole.

10. Methane dyestuffs of the general formula:

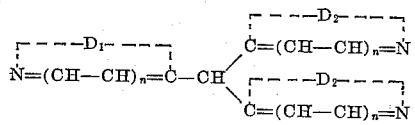

wherein $D_1$ is the residue of a heterocyclic nitrogen compound and $D_2$ is the residue of benzoxazole.

11. A process for the production of methane dyes which comprises reacting together an alkali-metal salt of a heterocyclic nitrogen base containing a reactive methyl group in one of the positions α and γ to the heterocyclic nitrogen atom with a heterocyclic nitrogen base containing a halogen atom in one of the positions α and γ to the heterocyclic nitrogen atom, the reaction being effected in liquid ammonia and in the presence of excess alkali metal.

12. A process for the production of methane dyes which comprises reacting together one molecular proportion of a sodium salt of a heterocyclic nitrogen base containing a reactive methyl group in one of the positions α and γ to the heterocyclic nitrogen atom with two molecular proportions of a heterocyclic nitrogen base containing a halogen atom in one of the positions α and γ to the heterocyclic nitrogen atom, the reaction being effected in liquid ammonia and in the presence of excess sodium.

JOHN DAVID KENDALL.
HARRY DEREK EDWARDS.

REFERENCES CITED

The following references are of record in the file of this patent:

UNITED STATES PATENTS

| Number | Name | Date |
|---|---|---|
| 2,166,736 | White et al. | July 18, 1939 |
| 2,263,749 | White et al. | Nov. 25, 1941 |
| 2,322,015 | Hamer et al. | June 15, 1943 |
| 2,340,882 | Kendall | Feb. 8, 1944 |
| 2,342,546 | Kendall | Feb. 22, 1944 |
| 2,353,164 | Kendall | July 11, 1944 |
| 2,478,367 | Brooker et al. | Aug. 9, 1949 |

OTHER REFERENCES

Berichte, vol. 53, pages 2064–2066 (1920).

Georgievics et al., "A Text-book of Dye Chemistry," 1920, page 168 (Scott-Greenwood & Son, publisher).

Chemical Abstracts, 16:3101 (Abstract of Brit. Med. Journal, 1922 I 514–515).

Chemical Abstracts, 19:530 (Abstract of Proc. Roy Soc., London, 96B 317–333, 1924).